United States Patent
Urano et al.

(10) Patent No.: US 11,294,382 B2
(45) Date of Patent: Apr. 5, 2022

(54) SYSTEMS AND METHODS FOR DETERMINING ROUTES TO DESTINATIONS FOR A VEHICLE

(71) Applicant: Toyota Research Institute, Inc., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: Toyota Research Institute, Inc., Los Altos, CA (US)

(*) Notice: Subject to any disclaimer, the term of this patent is extended or adjusted under 35 U.S.C. 154(b) by 385 days.

(21) Appl. No.: 16/199,928

(22) Filed: Nov. 26, 2018

(65) Prior Publication Data

US 2020/0166939 A1 May 28, 2020

(51) Int. Cl.
*G05D 1/02* (2020.01)
*B60W 30/182* (2020.01)
*G05D 1/00* (2006.01)
*B60W 50/00* (2006.01)

(52) U.S. Cl.
CPC ......... *G05D 1/0214* (2013.01); *B60W 30/182* (2013.01); *G05D 1/0061* (2013.01); *B60W 2050/007* (2013.01); *B60W 2552/05* (2020.02); *B60W 2555/20* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 4,554,493 A | 11/1985 | Armstrong | |
| 7,202,776 B2 | 4/2007 | Breed | |
| 8,457,827 B1 | 6/2013 | Ferguson | |
| 8,825,258 B2 | 9/2014 | Cullinane | |
| 8,849,494 B1 | 9/2014 | Herbach | |
| 8,880,270 B1 | 11/2014 | Ferguson | |
| 9,587,952 B1 | 3/2017 | Slusar | |
| 9,969,396 B2 | 5/2018 | Damman | |
| 10,248,120 B1* | 4/2019 | Siegel | G05D 1/0223 |
| 2014/0236414 A1 | 8/2014 | Droz | |

(Continued)

FOREIGN PATENT DOCUMENTS

| | | |
|---|---|---|
| DE | 102012021282 | 4/2014 |
| DE | 102015110903 | 1/2016 |
| DE | 102015224033 | 3/2017 |

*Primary Examiner* — Thomas E Worden
(74) *Attorney, Agent, or Firm* — Sheppard, Mullin, Richter & Hampton LLP; Hector A. Agdeppa; Daniel N. Yannuzzi

(57) ABSTRACT

Systems and methods for determining routes to destinations for a vehicle may: generate output signals; obtain road information for a set of roads; determine presence information that indicates whether one or more passengers are present in the vehicle; determine the location information of the vehicle; obtain a target destination that represents a location the vehicle is intended to reach; determine a first route including a first subset of the set of roads; determine a second route including a second subset of the set of roads; and control the vehicle autonomously to traverse the vehicle along either the first route or the second route in accordance with whether one or more passengers are present in the vehicle.

20 Claims, 3 Drawing Sheets

(56) References Cited

U.S. PATENT DOCUMENTS

| | | | |
|---|---|---|---|
| 2014/0336842 A1* | 11/2014 | Jang | G06K 9/00791 |
| | | | 701/1 |
| 2015/0149017 A1* | 5/2015 | Attard | B60W 30/18163 |
| | | | 701/23 |
| 2015/0203107 A1 | 7/2015 | Lippman | |
| 2015/0339928 A1 | 11/2015 | Ramanujam | |
| 2016/0026182 A1 | 1/2016 | Boroditsky | |
| 2017/0192437 A1* | 7/2017 | Bier | G05D 1/0016 |
| 2018/0039917 A1 | 2/2018 | Buttolo | |
| 2018/0079416 A1* | 3/2018 | Damman | B60W 10/10 |
| 2020/0116495 A1* | 4/2020 | Yasui | B60W 30/18163 |

* cited by examiner

SYSTEMS AND METHODS FOR DETERMINING ROUTES TO DESTINATIONS FOR A VEHICLE

TECHNICAL FIELD

The disclosed technology relates generally to systems and methods for determining routes to destinations for a vehicle, in particular, an autonomously operated vehicle.

DESCRIPTION OF RELATED ART

Vehicles may operate in one or both of a manual driving mode and an autonomous driving mode. Some vehicles may offer a selection of different driving modes to a vehicle operator or passenger.

BRIEF SUMMARY OF EMBODIMENTS

One aspect of the present disclosure relates to a system and/or vehicle configured for determining routes to destinations for a vehicle. The vehicle may include a set of sensors, one or more hardware processors, and/or other components. The set of sensors may be configured to generate output signals. The output signals may convey location information of the vehicle, internal passenger presence information, and/or other information. The internal passenger presence information may indicate whether one or more passengers are present in the vehicle. The processor(s) may be configured by machine-readable instructions. The processor(s) may be configured to obtain road information for a set of roads. The road information for individual roads may include road-surface information indicating one or more comfort levels for passengers upon traversal by vehicle of the individual roads. The processor(s) may be configured to determine the internal passenger presence information that indicates whether one or more passengers are present in the vehicle. The determination of the internal passenger presence information may be based on the output signals. The processor(s) may be configured to determine the location information of the vehicle. The location information may reflect a current location of the vehicle. The determination of the location information may be based on the output signals. The processor(s) may be configured to obtain a target destination that represents a location the vehicle is intended to reach. The processor(s) may be configured to determine a first route including a first subset of the set of roads. The first route may define a first traversal from the current location to the target destination. The first route may be determined such that the first subset includes only individual roads for which the road-surface information indicates at least a comfort level that meets a comfort threshold level. The determination of the first route may be responsive to the internal passenger presence information indicating one or more passengers are present in the vehicle. The processor(s) may be configured to determine a second route including a second subset of the set of roads. The second route may define a second traversal from the current location to the target destination. The second route may be determined such that the second subset includes at least one individual road for which the road-surface information indicates a particular comfort level that fails to meet the comfort threshold level. The second route may be shorter and/or faster than the first route. The determination of the second route may be responsive to the internal passenger presence information indicating no passengers are present in the vehicle. The processor(s) may be configured to control the vehicle autonomously to traverse the vehicle along either the first route or the second route in accordance with whether one or more passengers are present in the vehicle.

Another aspect of the present disclosure relates to a method for determining routes to destinations for a vehicle. The method may include generating output signals. The output signals may convey location information of the vehicle and internal passenger presence information. The internal passenger presence information may indicate whether one or more passengers are present in the vehicle. The method may include obtaining road information for a set of roads. The road information for individual roads may include road-surface information indicating one or more comfort levels for passengers upon traversal by vehicle of the individual roads. The method may include determining the internal passenger presence information that indicates whether one or more passengers are present in the vehicle. The determination of the internal passenger presence information may be based on the output signals. The method may include determining the location information of the vehicle. The location information may reflect a current location of the vehicle. The determination of the location information may be based on the output signals. The method may include obtaining a target destination that represents a location the vehicle is intended to reach. The method may include determining a first route including a first subset of the set of roads. The first route may define a first traversal from the current location to the target destination. The first route may be determined such that the first subset includes only individual roads for which the road-surface information indicates at least a comfort level that meets a comfort threshold level. The determination of the first route may be responsive to the internal passenger presence information indicating one or more passengers are present in the vehicle. The method may include determining a second route including a second subset of the set of roads. The second route may define a second traversal from the current location to the target destination. The second route may be determined such that the second subset includes at least one individual road for which the road-surface information indicates a particular comfort level that fails to meet the comfort threshold level. The second route may be shorter and/or faster than the first route. The determination of the second route may be responsive to the internal passenger presence information indicating no passengers are present in the vehicle. The method may include controlling the vehicle autonomously to traverse the vehicle along either the first route or the second route in accordance with whether one or more passengers are present in the vehicle.

As used herein, any association (or relation, or reflection, or indication, or correspondency) involving servers processors, client computing platforms, vehicles, sensors, output signals, driving modes, routes, roads, passengers and/or another entity or object that interacts with any part of the vehicle and/or plays a part in the operation of the vehicle, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

The figures are not intended to be exhaustive or to limit the invention to the precise form disclosed. It should be understood that the technology disclosed herein can be practiced with modification and alteration, and that the disclosed technology be limited only by the claims and the equivalents thereof.

DETAILED DESCRIPTION OF THE EMBODIMENTS

Vehicles capable of driving autonomously may use different ways to determine a route between a current location and a destination. Different routes may include roads that are of a lower comfort level for a passenger, such as an unpaved road. Different routes may be determined and/or selected based on different determinations regarding the number of passengers in an autonomous vehicle, and/or other determinations, as well as combinations of multiple determinations. For example, if an autonomous vehicle carries no passengers, a route may be determined and/or selected that includes one or more roads (or road segments) that are unpaved and/or unsurfaced or otherwise would be less comfortable to passengers than a paved road. Routes that include such roads may be faster and/or more energy-efficient than alternative routes that do not include such roads. In some implementations, a passenger may agree to a faster route even if it is less comfortable than a slower route.

Figure 1:
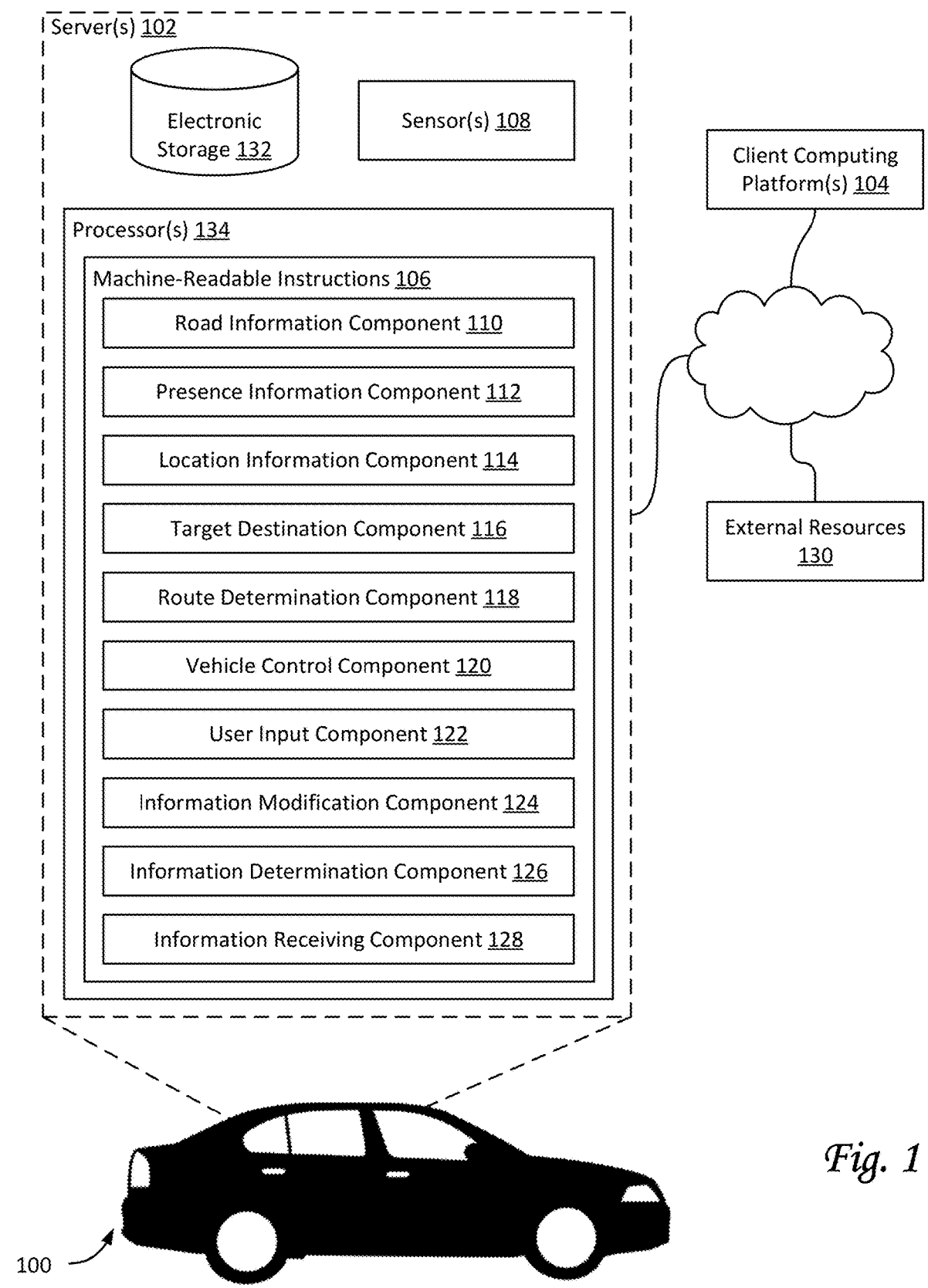
FIG. 1 shows a vehicle configured for determining routes to destinations for a vehicle, in accordance with one or more implementations.

FIG. 1 illustrates a vehicle 100 configured for determining routes to destinations for a vehicle, in accordance with one or more implementations. In some implementations, vehicle 100 may include one or more servers 102, one or more processors 126, one or more sensors 108, electronic storage 132, and/or other components. Vehicle 100 may be configured to communicate with one or more other vehicles and/or client computing platforms 104 according to a client/server architecture, a peer-to-peer architecture, and/or other architectures.

Sensors 108 may be configured to generate output signals conveying information. In some implementations, the information may be related to the operation of one or more vehicles. In some implementations, the information may include one or more of passenger presence information, visual information, motion-related information, position-related information, biometric information, and/or other information. In some implementations, internal passenger presence information may indicate whether one or more passengers are present in vehicle 100. Some or all sensors 108 may be carried by an individual vehicle, e.g., vehicle 100.

Information from sensors 108 may include, by way of non-limiting example, timing information, operator information, and/or other information. In some implementations, generated information may be associated with timing information (e.g., from a timer), operator information, and/or other information. In some implementations, timing information may associate and/or otherwise relate the generated output signals with one or more moments of generation by one or more particular sensors. For example, timing information may include time stamps that indicate moments of generation. For example, at a time labeled $t_1$ the speed of a vehicle may be 50 mph, at a time labeled $t_2$ the speed may be 55 mph, and so forth. A set of time stamps or moments in time may form a timeline. In some implementations, the operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=$t_x$) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources may be configured to store generated information, timing information, operator information, and/or other information, e.g., in electronic storage.

Sensor 108 may be configured to generate output signals conveying information related to the operation and/or one or more operating conditions of vehicle 100. Information related to the operation of vehicle 100 may include feedback information from one or more of the mechanical systems of the vehicle, and/or other information. In some implementations, at least one of sensors 108 may be a vehicle system sensor included in an engine control module (ECM) system or an electronic control module (ECM) system of vehicle 100. In some implementations, one or more sensors may be carried by vehicle 100. The sensors of a particular vehicle may be referred to as a set of sensors. An individual sensor may be vehicle-specific. Individual sensors may be configured to generate output signals conveying information. In some implementations, one or more components of vehicle 100 may determine one or more parameters that are measured, derived, estimated, approximated, and/or otherwise determined based on one or more output signals generated by sensors 108.

Sensors 108 may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a geolocation sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 100.

Sensors 108 may include image sensors, cameras, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 124, such that captured information may be stored, at least initially, in the integrated embedded storage of a particular vehicle, e.g., vehicle 100. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Server(s) 102 and/or processor(s) 126 may be configured by machine-readable instructions 106. Machine-readable instructions 106 may include one or more instruction components. The instruction components may include computer program components. The instruction components may include one or more of a road information component 110, a presence information component 112, a location information component 114, a target destination component 116, a route determination component 118, a vehicle control component 120, a user input component 122, an information modification component 124, an information determination component 126, an information receiving component 128, and/or other instruction components.

Road information component 110 may be configured to determine, retrieve, and/or obtain road information for a set of roads. In some implementations, road information may be obtained from a remote server. In some implementations, road information may be retrieved from (cloud) storage. The road information for individual roads may include road-surface information indicating one or more comfort levels for passengers upon traversal by vehicle of the individual roads. The one or more comfort levels may include a first comfort level, a second comfort level, a third comfort level, and so forth. For example, an unpaved and/or unsurfaced road may have a different comfort level than a paved road. For example, a cobble-stone road may have a different comfort level than an asphalt road, a tar and chip road, a gravel road, and/or other types of roads.

By way of non-limiting example, a comfort level indicated by the road-surface information of an individual road may include one or more of a score, a category, a rating, a ranking, a numerical value, a grade, a tier, a value, a number, and/or another type of indicator. In some implementations, a first comfort level may meet the comfort threshold level. In some implementations, a second comfort level may fail to meet the comfort threshold level. In some implementations, the comfort level of an individual road may be represented by a Boolean value. For example, a Boolean value may represent a paved or unpaved road.

Presence information component 112 may be configured to determine internal passenger presence information (or "presence information" for short) that indicates whether one or more passengers are present in the vehicle. The determination of the internal passenger presence information may be based on the output signals. In some implementations, internal passenger presence information may be represented by a Boolean value. In some implementations, internal passenger presence information may be a numerical value representing the number of passengers present in vehicle 100. In some implementations, internal passenger presence information may be determined such that only conscious passengers are counted as passengers within vehicle 100.

Location information component 114 may be configured to determine location information of vehicle 100. The location information may reflect a current location of the vehicle. The output signals may further convey information regarding a road surface at the current location of the vehicle. The determination of the location information may be based on the output signals. In some implementations, the location information may be based on output signals generated by a geolocation sensor. In some implementations, the location information may be based on Global Positioning System (GPS) technology. In some implementations, the location information may be based on technology similar to GPS.

Target destination component 116 may be configured to determine, receive, and/or obtain a target destination that represents a location vehicle 100 is intended to reach. In some implementations, a target destination may be received from a remote server. In some implementations, a target destination may be provided and/or entered by a passenger and/or other user.

Route determination component 118 may be configured to determine a first route including a first subset of the set of roads. The first route may define a first traversal from the current location to the target destination. By way of non-limiting example, the first route may be determined such that the first subset includes only individual roads for which the road-surface information indicates at least a comfort level that meets a comfort threshold level. The determination of the first route may be responsive to the internal passenger presence information indicating one or more passengers are present in the vehicle. In some implementations, the comfort threshold level may be specific to one or more of a model of vehicle 100, a make of vehicle 100, a mileage of vehicle 100, a physical or structural characteristic of vehicle 100, and/or may vary by the current time of day. In some implementations, the comfort threshold level may be passenger-specific. For example, a particular passenger may request that routes avoid cobble-stone roads.

Route determination component 118 may be configured to determine a second route including a second subset of the set of roads. The second route may define a second traversal from a current location to a target destination. The second route may include at least one unpaved and/or unsurfaced road. The second route may include at least one cobble-stone road. The second route may include at least one road that includes one or more speedbumps. The second route may be shorter and/or faster than the first route. In some implementations, the second route may be more energy-efficient than the first route.

In some implementations, the second route may be determined such that the second subset includes at least one individual road for which the road-surface information indicates a particular comfort level that fails to meet a comfort threshold level. In some implementations, the particular comfort level for unpaved and/or unsurfaced roads may fail to meet the comfort threshold level. In some implementations, the particular comfort level for cobble-stone roads may fail to meet the comfort threshold level. In some implementations, the particular comfort level for roads that may include speedbumps fails to meet the comfort threshold level. In some implementations, the determination of the second route may be responsive to the internal passenger presence information indicating no passengers are present in vehicle 100.

Vehicle control component 120 may be configured to control the vehicle autonomously to traverse the vehicle. In some implementations, vehicle control component 120 may be configured to control vehicle 100 along a determined route, e.g. along either the first route or the second route. In some implementations, the determined route may be in accordance with whether one or more passengers are present in the vehicle. Controlling the vehicle autonomously may include changing between the first route and the second route responsive to a change in the passenger presence information, and/or changes in other conditions or parameters.

Figure 3:
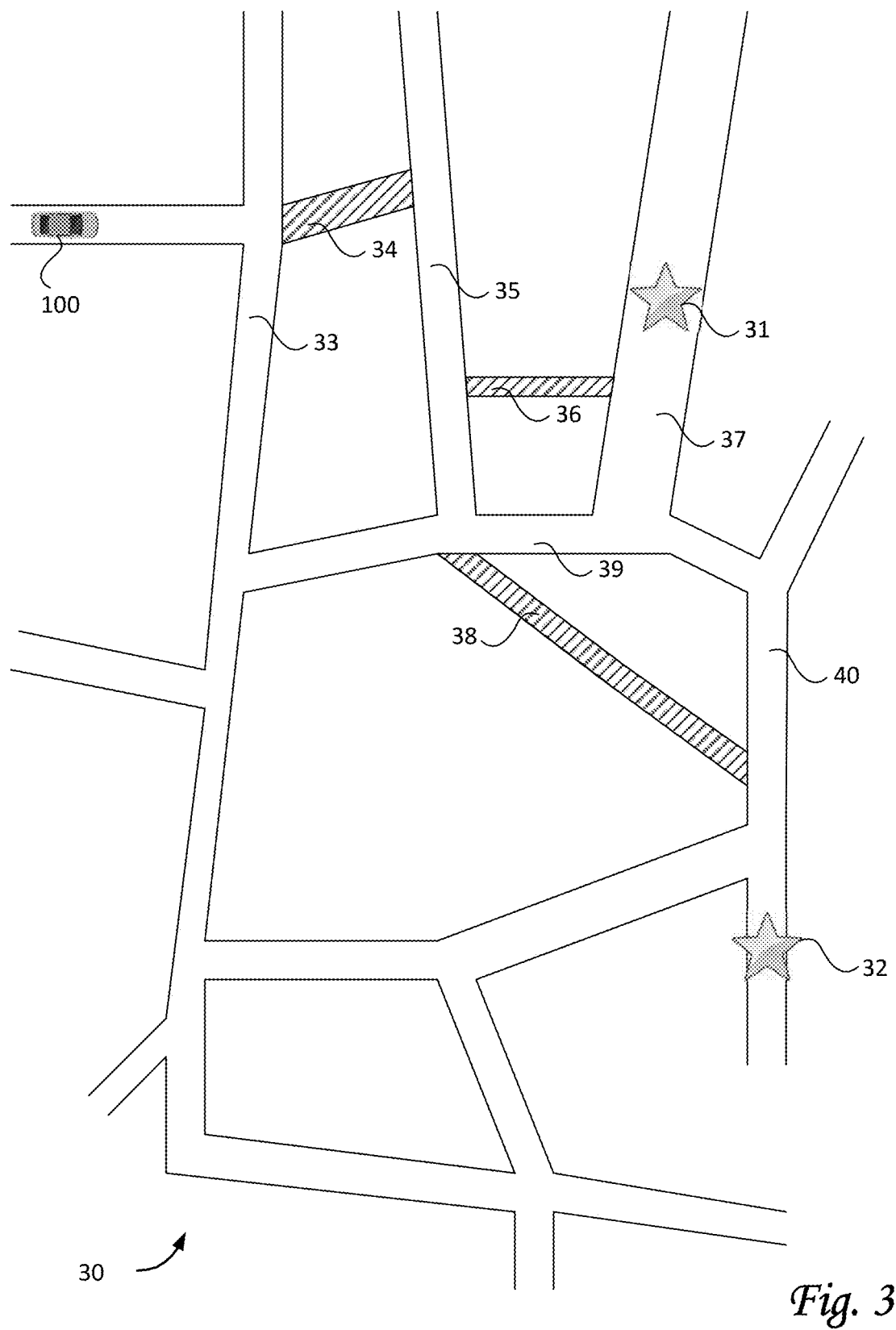
FIG. 3 illustrates scenarios in which a vehicle can determine and/or select different routes to a destination, in accordance with one or more implementations.

By way of non-limiting example, FIG. 3 illustrates scenarios in which vehicle 100 can determine and/or select different routes on a map 30 to a destination. For example, a first destination 31 may be indicated by a star. Map 30 may include paved roads 33, 35, 37, 39, and 40, and cobblestone road 34, unpaved road 36, and a road 38 with many speedbumps. A first route to destination 31 may include road 33, road 39, and road 37, e.g., if neither road 34 nor road 36 meets a particular comfort threshold level. A second route to destination 31 may include road 34, road 35, road 36, and a small section of road 37, even though some of the included roads are less comfortable. The second route may be shorter than the first route. Depending on reasonable speeds per individual road, the second route may be faster or slower than the first route.

As a second example illustrated by FIG. 3, a second destination 32 may be indicated by a star. A first route to destination 32 may include road 33, road 39, and road 40. Depending on the comfort threshold level and the particular road information for roads 34 and 38, neither road 34 nor road 38 is included in the first route. A second route to destination 32 may include, e.g., road 34, road 35, road 38, and a section of road 40, even though some of the included roads are less comfortable. The second route may be shorter than the first route. Depending on reasonable speeds per individual road, the second route may be faster or slower than the first route.

Referring to FIG. 1, user input component 122 may be configured to facilitate user input from one or more passengers. In some implementations, the user input may pertain to a comfort level of one or more roads, including but not limited to a current road at the current location of vehicle 100. In some implementations, the user input may represent a request for selection of one or more of a particular driving mode, a particular route, a (temporary) change in the comfort threshold level, and/or other selections that may affect how the vehicle is controlled to traverse to the target destination. For example, a passenger may request, through particular user input, the fastest and/or shortest available route to a particular destination regardless of comfort level. For example, in some implementations, passengers may provide user input through one or more of a user interface in the vehicle, a mobile application that is accessed through a client computing device, and/or other ways to provide user input. By way of non-limiting example, a client computing device may include one or more of a desktop computer, a laptop computer, a handheld computer, a tablet computing platform, a NetBook, a smart phone, a gaming console, and/or other computing devices.

Information modification component 124 may be configured to modify the road-surface information for one or more particular roads in the set of roads. In some implementations, one or more modifications may be based on the user input. In some implementations, one or more modifications may be based on information received from a remote server. In some implementations, one or more modifications may be based on information based on output signals generated by one or more sensors 108 carried by vehicle 100. For example, particular output signals may convey information regarding a road surface at the current location of vehicle 100. In some implementations, vehicle 100 may be configured to re-determining its route (e.g., the first route and/or the second route) subsequent to one or more modifications.

Information determination component 126 may be configured to determine road-surface information for one or more particular roads in the set of roads. The road-surface information may indicate a particular comfort level for unpaved and/or unsurfaced roads. The road-surface information may indicate a particular comfort level for cobble-stone roads. The road-surface information may indicate a particular comfort level for roads that include speedbumps. The determination may be based on the output signals from sensors 108. For example, sensors 108 may be configured to generate output signals conveying information regarding (lateral) movement of vehicle 100 while traversing a particular road. These output signals may be used to determine a current comfort level of the particular road. For example, as potholes appear on certain roads, the determined comfort level of those roads may decrease over time. Likewise, as potholes are fixed on certain roads, the determined comfort level of those roads may increase over time.

Information receiving component 128 may be configured to receive information. In some implementations, information may be received from a remote server, one or more external resources 130, and/or other sources. In some implementations, received information may regard a road-surface for a particular road in the set of roads. In some implementations, received information may include road information, a target destination, traffic information, weather information, road closures, and/or other information.

In some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program components. For example, in some implementations, other vehicles may be considered as client computing platforms. The computer program components may be configured to enable an expert or user associated with the given client computing platform 104 to interface with vehicle 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a vehicle, and/or other computing platforms.

External resources 130 may include sources of information outside of vehicle 100, external entities participating with vehicle 100, and/or other resources. In some implementations, external resources 130 may include one or more remote servers. For example, a remote server may be configured to provide road information, a target destination, traffic information, weather information, road closures, and/or other information. In some implementations, some or all of the functionality attributed herein to external resources 130 may be provided by resources included in vehicle 100.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 110, 112, 114, 116, 118, 120, 122, 124, 126, and/or 128, and/or other components. Processor(s) 134 may be configured to execute components 110, 112, 114, 116, 118, 120, 122, 124, 126, and/or 128, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, 120, 122, 124, 126, and/or 128 are illustrated in FIG. 1 as being implemented within a single processing unit, in implementations in which processor(s) 134 includes multiple processing units, one or more of components 110, 112, 114, 116, 118, 120, 122, 124, 126, and/or 128 may be implemented remotely from the other components. The description of the functionality provided by the different components 110, 112, 114, 116, 118, 120, 122, 124, 126, and/or 128 described below is for illustrative purposes, and is not intended to be limiting, as any of components 110, 112, 114, 116, 118, 120, 122, 124, 126, and/or 128 may provide more or less functionality than is described. For example, one or more of components 110, 112, 114, 116, 118, 120, 122, 124, 126, and/or 128 may be eliminated, and some or all of its functionality may be provided by other ones of components 110, 112, 114, 116, 118, 120, 122, 124, 126, and/or 128. As another example, processor(s) 134 may be configured to execute one or more additional components that may perform some or all of the functionality attributed below to one of components 110, 112, 114, 116, 118, 120, 122, 124, 126, and/or 128.

Figure 2:
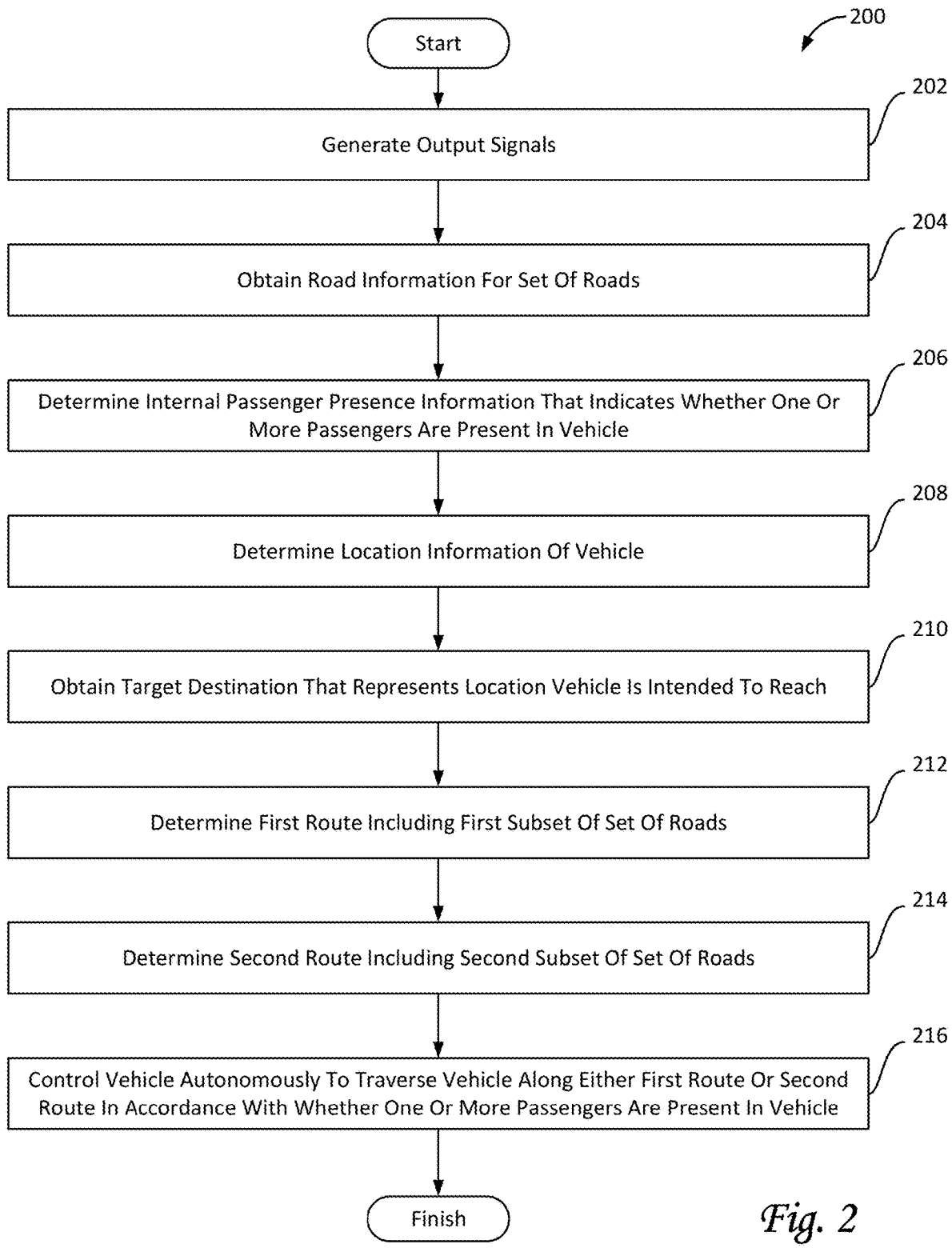
FIG. 2 includes a flow chart of a method for determining routes to destinations for a vehicle, in accordance with one or more implementations.

FIG. 2 illustrates a method 200 for determining routes to destinations for a vehicle, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating output signals. The output signals may convey location information of the vehicle and internal passenger presence information. The internal passenger presence information may indicate whether one or more passengers are present in the vehicle. Operation 202 may be performed by one or more sensors that are the same as or similar to sensor(s) 108, in accordance with one or more implementations.

An operation 204 may include obtaining road information for a set of roads. The road information for individual roads may include road-surface information indicating one or more comfort levels for passengers upon traversal by vehicle of the individual roads. Operation 204 may be performed by one or more hardware processors configured by machine-readable instructions including a component that is the same as or similar to road information component 110, in accordance with one or more implementations.

An operation 206 may include determining internal passenger presence information that indicates whether one or more passengers are present in the vehicle. The determination of the internal passenger presence information may be based on the output signals. Operation 206 may be performed by one or more hardware processors configured by machine-readable instructions including a component that is the same as or similar to presence information component 112, in accordance with one or more implementations.

An operation 208 may include determining the location information of the vehicle. The location information may reflect a current location of the vehicle. The determination of the location information may be based on the output signals. Operation 208 may be performed by one or more hardware processors configured by machine-readable instructions including a component that is the same as or similar to location information component 114, in accordance with one or more implementations.

An operation 210 may include obtaining a target destination that represents a location the vehicle is intended to reach. Operation 210 may be performed by one or more hardware processors configured by machine-readable instructions including a component that is the same as or similar to target destination component 116, in accordance with one or more implementations.

An operation 212 may include determining a first route including a first subset of the set of roads. The first route may define a first traversal from the current location to the target destination. The first route may be determined such that the first subset includes only individual roads for which the road-surface information indicates at least a comfort level that meets a comfort threshold level. The determination of the first route may be responsive to the internal passenger presence information indicating one or more passengers are present in the vehicle. Operation 212 may be performed by one or more hardware processors configured by machine-readable instructions including a component that is the same as or similar to route determination component 118, in accordance with one or more implementations.

An operation 214 may include determining a second route including a second subset of the set of roads. The second route may define a second traversal from the current location to the target destination. The second route may be determined such that the second subset includes at least one individual road for which the road-surface information indicates a particular comfort level that fails to meet the comfort threshold level. The second route may be shorter and/or faster than the first route. The determination of the second route may be responsive to the internal passenger presence information indicating no passengers are present in the vehicle. Operation 214 may be performed by one or more hardware processors configured by machine-readable instructions including a component that is the same as or similar to route determination component 118, in accordance with one or more implementations.

An operation 216 may include controlling the vehicle autonomously to traverse the vehicle along either the first route or the second route in accordance with whether one or more passengers are present in the vehicle. Operation 216 may be performed by one or more hardware processors configured by machine-readable instructions including a component that is the same as or similar to vehicle control component 120, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. Thus, the breadth and scope of the technology disclosed herein should not be limited by any of the above-described exemplary implementations.

Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow charts, operational descriptions and method claims, the order in which the steps are presented herein shall not mandate that various implementations be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of words and phrases such as "one or more," "at least," "but not limited to" or other like phrases in some instances shall not be read to mean that the narrower case is intended or required in instances where such phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various implementations set forth herein are described in terms of exemplary block diagrams, flow charts and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

What is claimed is:

1. A vehicle configured to determine routes to destinations for the vehicle, the vehicle comprising:
    a set of sensors configured to generate output signals conveying location information of the vehicle and internal passenger presence information indicating whether one or more passengers are present in the vehicle;
    electronic storage configured to store: (a) road information for a set of roads, and (b) passenger-specific profiles that at least include comfort-based preferences data, wherein the road information for individual roads includes road-surface information indicating one or more comfort-based scores assigned to and associated with the individual roads passengers would experience upon traversal by the vehicle of the individual roads;
    a user interface in operable communication with the electronic storage and the set of sensors, accessible by the one or more passengers when present in the vehicle, wherein the user interface enables inputs by the one or more passengers; and
    one or more physical computer processors configured by computer-readable instructions to:
        determine the internal passenger presence information based on the generated output signals from the set of sensors, and when received, the inputs by the one or more passengers via the user interface;
        determine the location information reflecting a current location of the vehicle;
        obtain a target destination that represents a location the vehicle is intended to reach;
        determine a first route including a first subset of the set of roads, wherein the first route defines a first traversal from the current location to the target destination, wherein the first route is determined such that the first subset includes only individual roads for which the road-surface information indicates that all of the associated comfort-based scores are at or above a minimum comfort-based score, wherein the minimum comfort-based score is set to be a default comfort-based score when there has not been a selected specific passenger profile and is set to a passenger-specific comfort-based scored based on the comfort-based preferences data and the comfort-based threshold data each associated with the selected specific passenger profile;
        without utilizing the minimum comfort-based score, determine a second route including a second subset of the set of roads, wherein the second route defines a second traversal from the current location to the target destination that is shorter and/or faster and/or more energy efficient than the first route;
        responsive to the internal passenger presence information indicating no passengers are present in the vehicle, control the vehicle autonomously to traverse the vehicle along the second route; and
        responsive to the internal passenger presence information indicating one or more passengers are present in the vehicle, send an inquiry to the one or more passengers via the user interface requesting a selection of either the first route or the second route, and control the vehicle autonomously to traverse the vehicle along either the first route or the second route in accordance with the selection of the first route or the second route made by the one or more passengers via the user interface.

2. The vehicle of claim 1, wherein the road-surface information indicates a particular comfort-based score for unpaved and/or unsurfaced roads, wherein the particular comfort-based score for unpaved and/or unsurfaced roads fails to meet the minimum comfort-based score, and wherein the second route includes at least one unpaved and/or unsurfaced road.

3. The vehicle of claim 1, wherein the road-surface information indicates a particular comfort-based score for cobble-stone roads, wherein the particular comfort-based score for cobble-stone roads fails to meet the minimum comfort-based score and wherein the second route includes at least one cobble-stone road.

4. The vehicle of claim 1, wherein the road-surface information indicates a particular comfort-based score for roads that include speedbumps, wherein the particular comfort-based score for roads that include speedbumps fails to meet the minimum comfort-based score, and wherein the second route includes at least one road that includes a speedbump.

5. The vehicle of claim 1, wherein the one or more physical computer processors are further configured by computer-readable instructions to:
    facilitate the inputs by the one or more passengers via the user interface; and
    modify the road-surface information for one or more particular roads in the set of roads, wherein the modification is based on the inputs by the one or more passengers.

6. The vehicle of claim 1, wherein the output signals further convey information regarding a road surface at the current location of the vehicle, wherein the one or more physical computer processors are configured by computer-readable instructions to:
    determine road-surface information for one or more particular roads in the set of roads, wherein the determination is based on the output signals; and modify the road-surface information for the one or more particular roads in the set of roads, wherein the modification is based on the determination.

7. The vehicle of claim 1, wherein obtaining the target destination includes receiving information from a remote server, wherein the received information identifies the target destination.

8. The vehicle of claim 1, wherein the one or more physical computer processors are configured by computer-readable instructions to:
receive, from a remote server, information regarding a road-surface for a particular road in the set of roads;
modify the road-surface information for the particular road, wherein the modification is based on the received information; and
subsequent to the modification, re-determine the first route and the second route.

9. The vehicle of claim 1, wherein the minimum comfort-based score is specific to a model of the vehicle, or varies by a current time of day, or both.

10. The vehicle of claim 1, wherein the minimum comfort-based score is passenger-specific.

11. A method for determining routes to destinations for a vehicle, the method comprising:
generating output signals convey location information of the vehicle and internal passenger presence information;
obtaining: (a) road information for a set of roads, and (b) passenger-specific profiles that at least include comfort-based preferences data, wherein the road information for individual roads includes road-surface information indicating one or more comfort-based scores assigned to and associated with the individual roads passengers would experience upon traversal by the vehicle of the individual roads;
determining the internal passenger presence information based on the generated output signals, and when received, inputs by one or more passengers via a user interface accessible by the one or more passengers when present in the vehicle, wherein the user interface enables inputs by the one or more passengers;
determining the location information of the vehicle, wherein the location information reflects a current location of the vehicle;
obtaining a target destination that represents a location the vehicle is intended to reach;
determining a first route including a first subset of the set of roads, wherein the first route defines a first traversal from the current location to the target destination, wherein the first route is determined such that the first subset includes only individual roads for which the road-surface information indicates that all of the associated comfort-based scores are at or above a minimum comfort-based score, wherein the minimum comfort-based score is set to be a default comfort-based score when there has not been a selected specific passenger profile and is set to a passenger-specific comfort-based scored based on the comfort-based preferences data and the comfort-based threshold data each associated with the selected specific passenger profile;
without utilizing the minimum comfort-based score, determining a second route including a second subset of the set of roads, wherein the second route defines a second traversal from the current location to the target destination that is shorter and/or faster and/or more energy efficient than the first route; and responsive to the internal passenger presence information indicating no passengers are present in the vehicle, controlling the vehicle autonomously to traverse the vehicle along the second route; and
responsive to the internal passenger presence information indicating one or more passengers are present in the vehicle, sending an inquiry to the one or more passengers via the user interface requesting a selection of either the first route or the second route, and controlling the vehicle autonomously to traverse the vehicle along either the first route or the second route in accordance with the selection of the first route or the second route made by the one or more passengers via the user interface.

12. The method of claim 11, wherein the road-surface information indicates a particular comfort-based score for unpaved and/or unsurfaced roads, wherein the particular comfort-based score for unpaved and/or unsurfaced roads fails to meet the minimum comfort-based score, and wherein the second route includes at least one unpaved and/or unsurfaced road.

13. The method of claim 11, wherein the road-surface information indicates a particular comfort-based score for cobble-stone roads, wherein the particular comfort-based score for cobble-stone roads fails to meet the minimum comfort-based score, and wherein the second route includes at least one cobble-stone road.

14. The method of claim 11, wherein the road-surface information indicates a particular comfort-based score for roads that include speedbumps, wherein the particular comfort-based score for roads that include speedbumps fails to meet the minimum comfort-based score, and wherein the second route includes at least one road that includes a speedbump.

15. The method of claim 11, further comprising:
facilitating the inputs by the one or more passengers via the user interface; and
modifying the road-surface information for one or more particular roads in the set of roads, wherein the modification is based on the inputs by the one or more passengers.

16. The method of claim 11, wherein the output signals further convey information regarding a road surface at the current location of the vehicle;
determining road-surface information for one or more particular roads in the set of roads, wherein the determination is based on the output signals; and
modifying the road-surface information for the one or more particular roads in the set of roads, wherein the modification is based on the determination.

17. The method of claim 11, wherein obtaining the target destination includes receiving information from a remote server, wherein the received information identifies the target destination.

18. The method of claim 11, further comprising:
receiving, from a remote server, information regarding a road-surface for a particular road in the set of roads; and
modifying the road-surface information for the particular road, wherein the modification is based on the received information; and subsequent to the modification, re-determining the first route and the second route.

19. The method of claim 11, wherein the minimum comfort-based score is specific to a model of the vehicle, or varies by a current time of day, or both.

20. The method of claim 11, wherein the minimum comfort-based score is passenger-specific.

\* \* \* \* \*